United States Patent
Shiraishi et al.

(10) Patent No.: US 7,309,538 B2
(45) Date of Patent: Dec. 18, 2007

(54) FUEL CELL STACK

(75) Inventors: Koichi Shiraishi, Hokkaido (JP); Masao Ando, Aichi (JP); Munehisa Horiguchi, Aichi (JP)

(73) Assignee: Kabushikikaisha Equos Research (JP)

( * ) Notice: Subject to any disclaimer, the term of this patent is extended or adjusted under 35 U.S.C. 154(b) by 425 days.

(21) Appl. No.: 10/358,356

(22) Filed: Feb. 5, 2003

(65) Prior Publication Data

US 2003/0162066 A1    Aug. 28, 2003

(30) Foreign Application Priority Data

Feb. 28, 2002    (JP)    ............................. 2002-054697

(51) Int. Cl.
H01M 8/04    (2006.01)
H01M 2/14    (2006.01)

(52) U.S. Cl. .............................. 429/26; 429/24; 429/38

(58) Field of Classification Search ..................... None
See application file for complete search history.

(56) References Cited

U.S. PATENT DOCUMENTS

| | | | |
|---|---|---|---|
| 6,087,028 A * | 7/2000 | Goto | 429/24 |
| 6,242,118 B1 * | 6/2001 | Grasso et al. | 429/13 |
| 6,596,426 B2 * | 7/2003 | Yang et al. | 429/26 |

FOREIGN PATENT DOCUMENTS

| | | |
|---|---|---|
| JP | 06-223855 | 1/1993 |
| JP | 07-094202 | 9/1993 |
| WO | 97/48142 | 6/1997 |

* cited by examiner

Primary Examiner—Patrick Joseph Ryan
Assistant Examiner—Karie O'Neill
(74) Attorney, Agent, or Firm—Bacon & Thomas, PLLC

(57) ABSTRACT

In starting power generation under low temperature conditions, an antifreeze liquid being coolant of a cooling system in a fuel cell stack is once recovered in a tank to reduce heat capacity of the fuel cell stack, and thereafter the power generation is started. Heat of reaction caused by the power generation restores the temperature to temperature under normal operation, and then the antifreeze liquid is again filled to drive the cooling system, so as to make it function as a cooler.

14 Claims, 14 Drawing Sheets

FUEL CELL STACK

BACKGROUND OF THE INVENTION

1. Field of the Invention

The present invention relates to a fuel cell stack, particularly to facilitating its startup under freezing conditions.

2. Description of Related Art

Conventionally, a fuel cell generates heat of reaction and water in power generation. In a normal power generation state, a cooling device is provided therein to prevent the heat of reaction from raising the temperature of the fuel cell more than necessary. However, it is known that when starting the power generation under freezing conditions, the fuel cell is required to have a constant temperature, otherwise power generation efficiency drops off.

This is because, under the freezing conditions, water generated by the power-generating reaction freezes on a surface of an electrode so as to prevent oxygen supply to the electrode. Such freezing of the generated water is caused by absorption of the heat of reaction produced by the power generation into a separator of the fuel cell. Therefore, it has been proposed that a heat generator such as a heater be separately provided to start the power generation, as described in Japanese Patent Laid-Open No. Hei 7-94202, and that the power output is gradually increased from a low level at the start of power generation to prevent the generated water from freezing, as described in Japanese translation of PCT publication No. 2000-512068.

However, providing a separate heat generator consumes extra electric power, and makes the device large-sized. In addition, there is also the problem that increasing the power generation gradually requires a long time to reach a normal state.

SUMMARY OF THE INVENTION

An object of the present invention is to facilitate startup of a fuel cell under freezing conditions.

The above object is achieved by the present invention by providing a fuel cell stack, having unit cells, separators located between the unit cells, each separator having a passage for supplying gas to a unit cell, the unit cells and the separators being alternately layered to form a power-generating portion, and heat capacity changing means for changing the heat capacity of the fuel cell stack.

Preferably, the heat capacity changing means changes an amount of heat release from the fuel cell stack in accordance with a shut down period and a startup period.

In one embodiment, the heat capacity changing means controls supply and discharge of cooling water to/from the separators of the fuel cell stack.

In another embodiment, the heat capacity changing means replaces a constituent of the fuel cell stack with a medium having a lower specific heat.

Preferably, the separator is made of a metal plate.

The fuel cell stack of the present invention preferably further includes temperature detecting means for detecting temperature of the fuel cell stack and control means for decreasing the heat capacity, utilizing the heat capacity changing means, when the detected temperature is a specified value or below.

In yet another embodiment, the present invention provides fuel cell stack, having unit cells and separators alternately layered to form a power-generating portion, each separator including a passage for supplying gas to a unit cell and a holding portion for holding an antifreeze liquid for cooling, wherein the fuel cell stack further includes control means for emptying the antifreeze liquid from the holding portion prior to startup of the fuel cell. This latter embodiment may further include an antifreeze liquid tank located lower than the separators and a discharge passage for discharging the antifreeze liquid from the holding portion to the antifreeze liquid tank. In this embodiment also, the separator is preferably a metal plate.

In yet another embodiment, the present invention provides a fuel cell stack having unit cells and separators connecting between the unit cells, wherein the fuel cell stack includes a heat conduction path changing means for changing the heat conduction path of the heat of reaction generated in the unit cell on power generation, during a startup period at low temperature and a shut down period. In this embodiment also, the separator is preferably a metal plate.

DETAILED DESCRIPTION OF THE PREFERRED EMBODIMENTS

Figure 1:
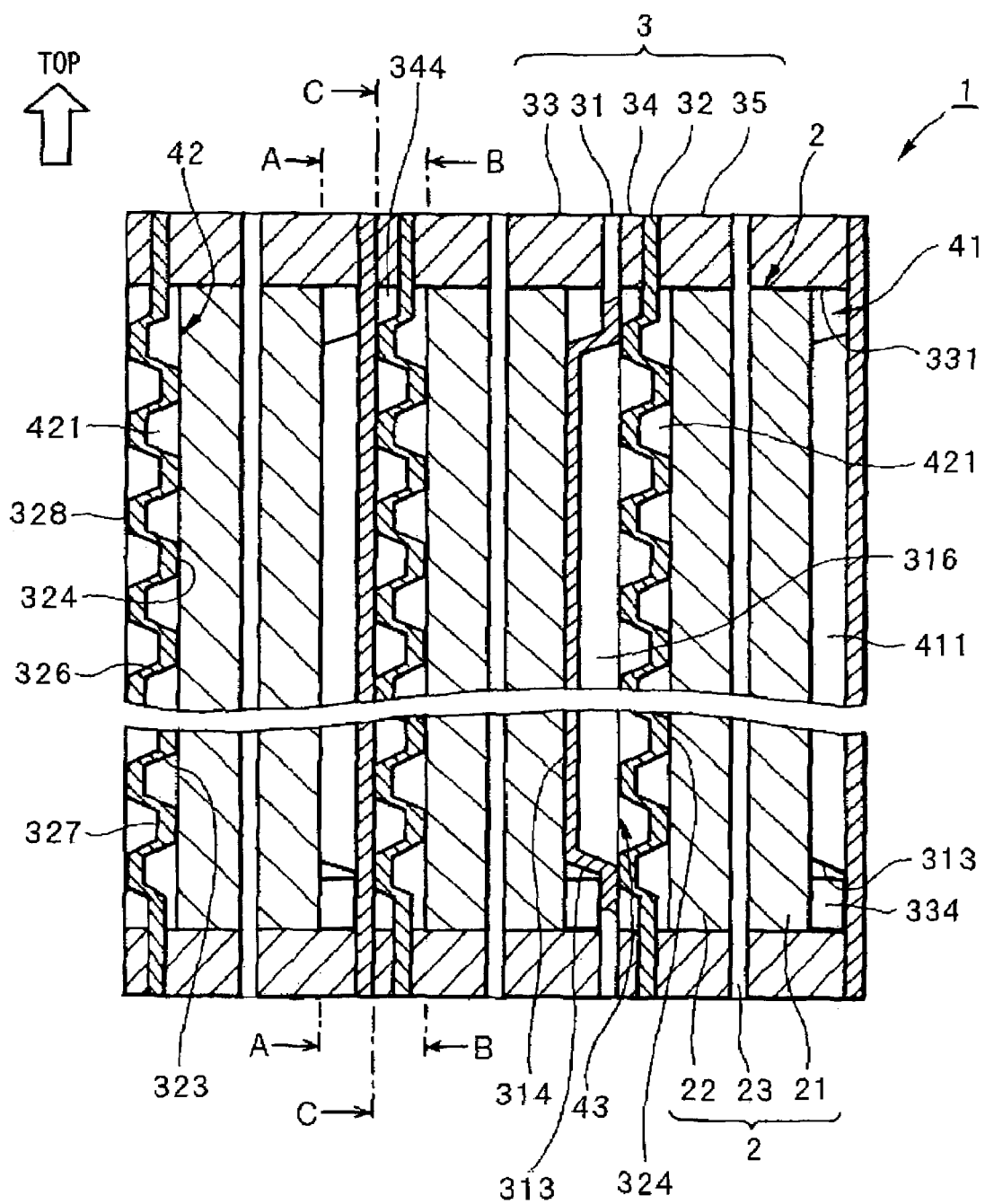
FIG. 1 is a side view of a partial cross-section of a fuel cell stack of the present invention.
Figure 2:
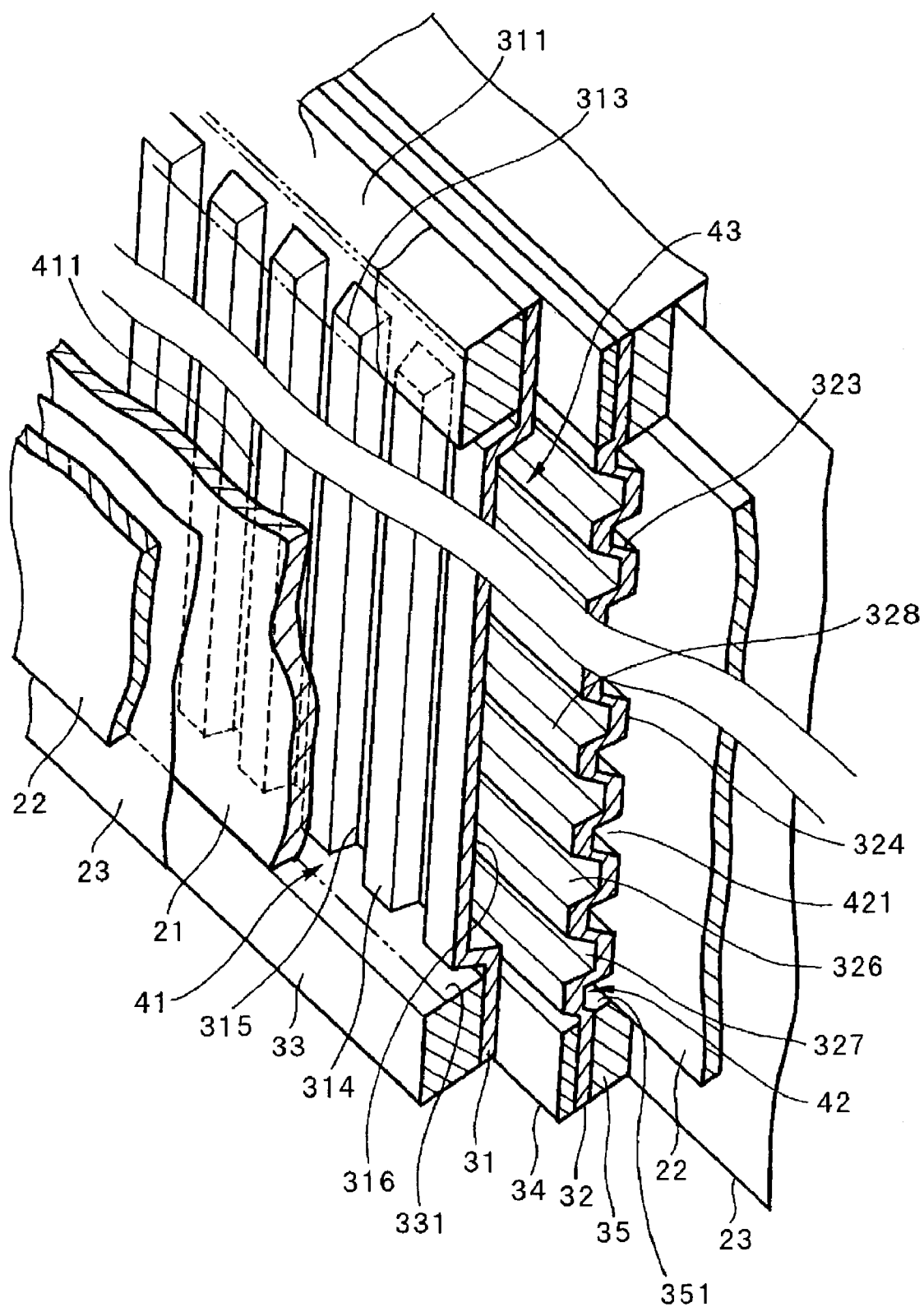
FIG. 2 is a perspective view of a partial cross-section of the fuel cell stack of the present invention.

Hereinafter, a fuel cell stack 1 of the present invention is described in detail based on the attached drawings. FIG. 1 is a side view of a partial cross section of a fuel cell stack 1 and FIG. 2 is a perspective view of a partial cross section thereof. The fuel cell stack 1 of the present invention comprises a unit cell 2 and a separator 3. The unit cell 2 is structured with a cathode 21, an anode 22, and a solid polymer electrolyte membrane 23 sandwiched therebetween. The separator 3 comprises current collecting members 31, 32 coming into contact with the cathode 21 and the anode 22 respectively to take out current to outside, and gaskets 33, 34, 35 stacked on a peripheral edge portion of each current collecting member 31, 32.

The current collecting members 31, 32 each are made of a metal plate. For this constituent metal, such a metal is used that has electric conductivity to function as the current collecting member, and that has corrosion resistance to obtain a current-carrying state. For example, a metal such as stainless steel, a nickel alloy, and a titanium alloy with a corrosion-resistant electric conductivity process applied may be cited. Here, for example, gold plating or the like may be cited as the corrosion-resistant electric conductivity process.

Figure 3:
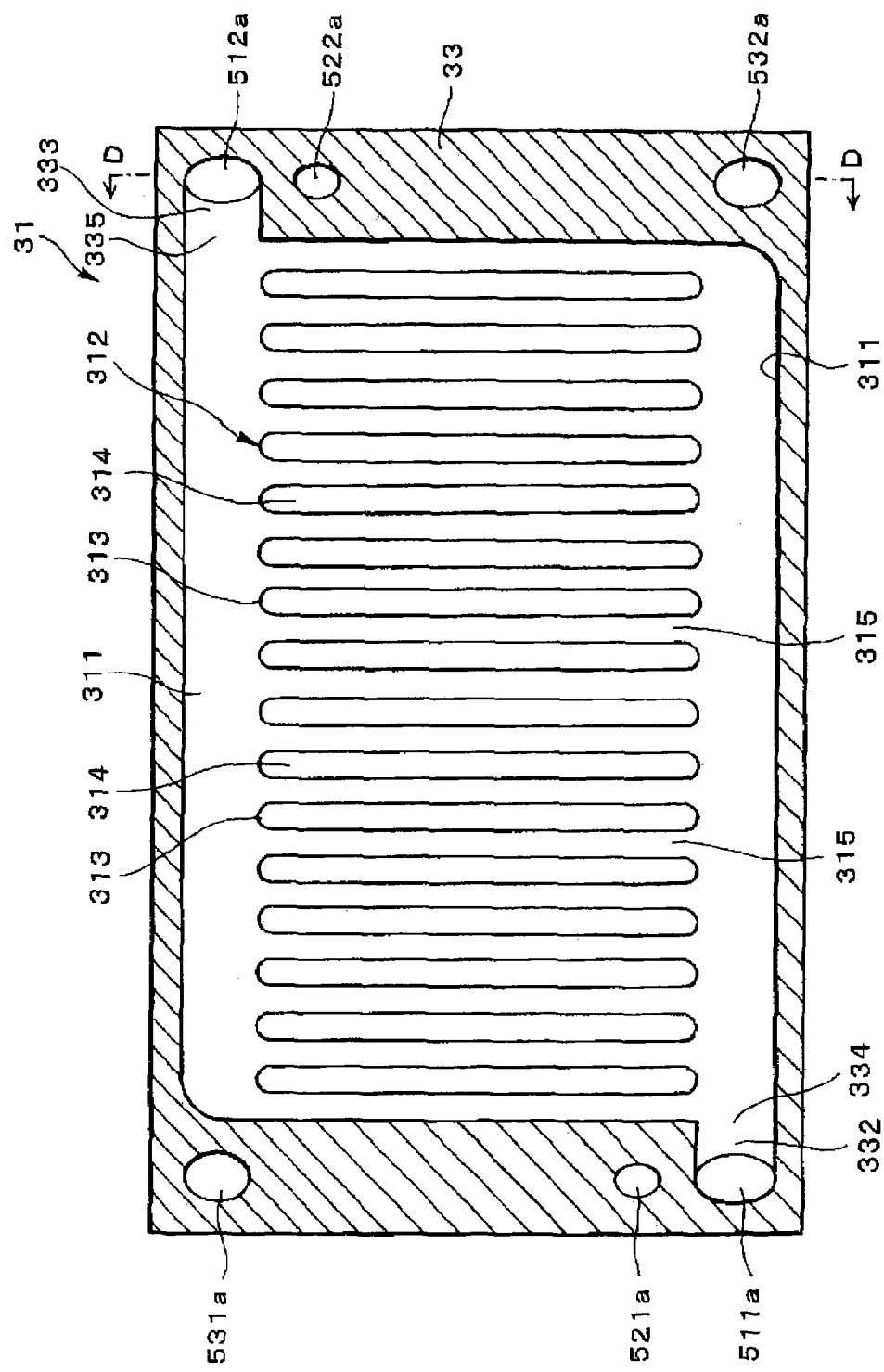
FIG. 3 is a cross-section taken along line A-A in FIG. 1.

The current collecting member 31 abuts on the cathode 21, while the current collecting member 32 abuts on the anode 22. FIG. 3 is an A-A cross section of FIG. 1. The current collecting member 31 is made of a rectangular plate material, comprising a cathode-abutting portion 312 provided on a surface thereof and a plane portion 311 formed around the cathode-abutting portion 312. The cathode-abutting portion 312 comprises plural lifted portions 313 formed by protruding into a cathode 21 side. The lifted portions 313, which protrude from a surface of the plane portion 311, are formed successively in linear-shapes and provided in a short edge direction of the current collecting member 31. The thus-structured plural lifted portions 313 are arranged at even intervals along a long edge of the current collecting member 31. Tip portions in a protruding direction of the lifted portions 313 serve as abutting end portions 314 formed in parallel to the cathode 21 into linear-shapes to abut on the cathode 21, which operates as a current collecting portion. When the current collecting member 31 is stacked on the unit cell 2, the plural abutting end portions 314 abut on a surface of the cathode 21, respectively.

Grooves 315 are formed between the lifted portions 313. Bottom surfaces of the grooves 315 lie on the same plane surface as the plane surface portion 311. When the current collecting member 31 and the unit cell 2 are stacked, oxygen passes 411 through which oxygen passes are formed with the grooves 315 and the cathode 21.

On a back surface of the current collecting member 31, portions where the lifted portions 313 are formed serve as recessed portions, which results in forming plural grooves 316. Therefore, the grooves 316 are also formed in parallel to a short edge of the current collecting member 31 into linear-shapes and arranged at even intervals along its long edge direction.

In the vicinity of both end portions in the long edge direction of the current collecting member 31, an oxygen flowing-out hole 511a, a hydrogen flowing-out hole 521a, and a coolant flowing-out hole 531a are formed on one end, while on the other end, an oxygen flowing-in hole 512a, a hydrogen flowing-in hole 522a, and a coolant flowing-in hole 532a are formed. The oxygen flowing-out hole 511a and the oxygen flowing-in hole 512a each are arranged at a position symmetric with respect to the center of a figure (in a diagonal direction) when the current collecting member 31 is plane-viewed. The rest of the hydrogen flowing-out hole 521a and the hydrogen flowing-in hole 522a, and the coolant flowing-out hole 531a and the coolant flow-in hole 532a are arranged in the same positional relationship. Such an arrangement allows fluid that flows into each space formed in the separator 3 to pass through the relevant space more uniformly.

Figure 4:
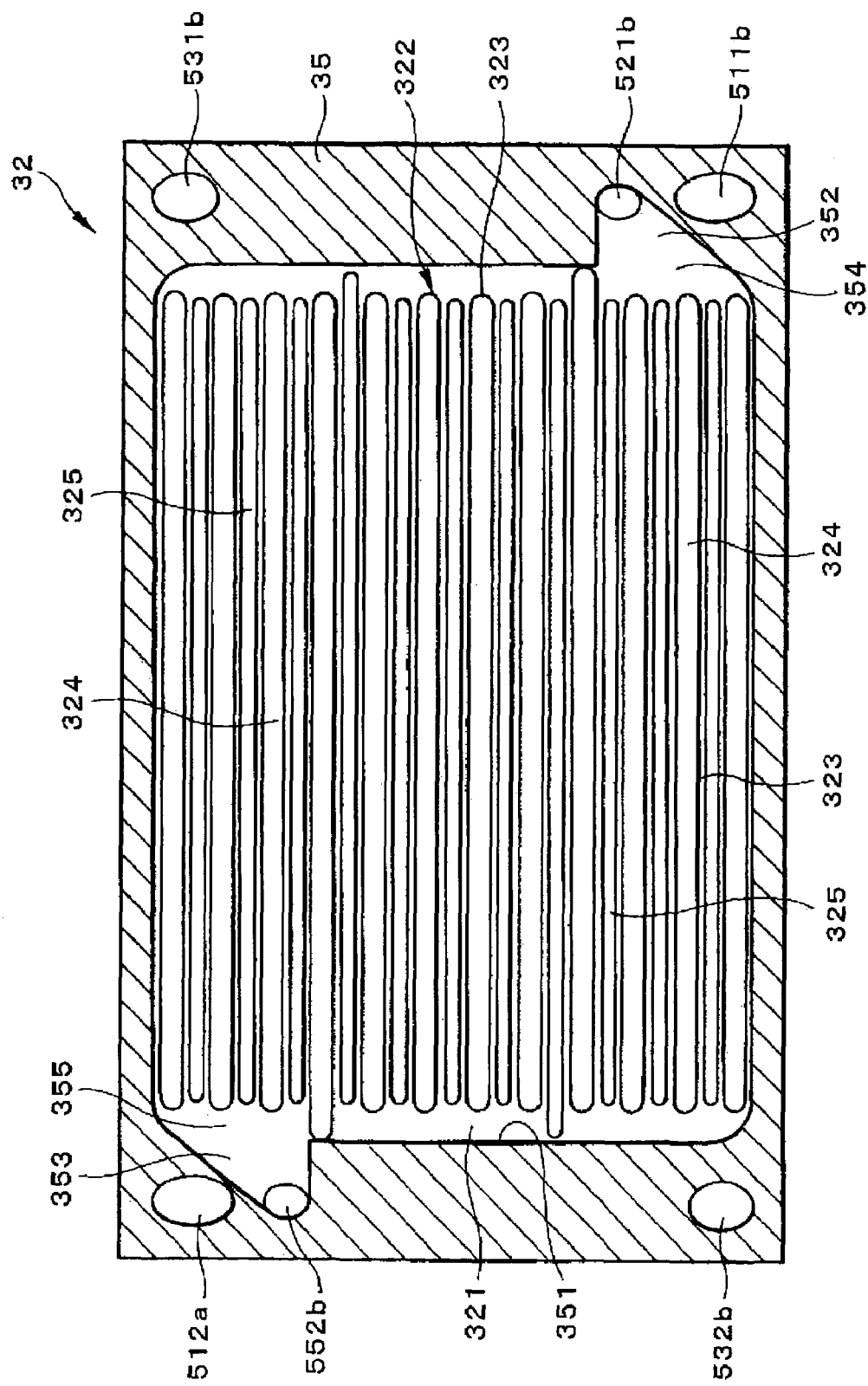
FIG. 4 is a cross-section taken along line B-B in FIG. 1.

FIG. 4 is a B-B cross section of FIG. 1. The current collecting member 32 is made of a rectangular plate material, comprising an anode-abutting portion 322 provided on a surface thereof and a plane portion 321 formed around the anode-abutting portion 322. The anode-abutting portion 322 comprises plural front surface-lifted portions 323 formed by protruding into an anode 22 side. The front surface-lifted portions 323, which protrude from a surface of the plane portion 321, are formed successively in linear-shapes and provided in a long edge direction of the current collecting member 32. The thus-structured plural front surface-lifted portions 323 are arranged at even intervals along a short edge of the current collecting member 32. Tip portions in a protruding direction of the front surface-lifted portions 323 serve as abutting end portions 324 formed in parallel to the anode 22 into linear-shapes to abut on the anode 22, which operates as the current collecting portion. When the current collecting member 32 is stacked on the unit cell 2, the plural abutting end portions 324 abut on a surface of the anode 22, respectively.

Grooves 325 are formed between the front surface-lifted portions 323. When the current collecting member 32 and the unit cell 2 are stacked, hydrogen passes 421 through which hydrogen passes are formed with the grooves 325 and the anode 22.

Figure 5:
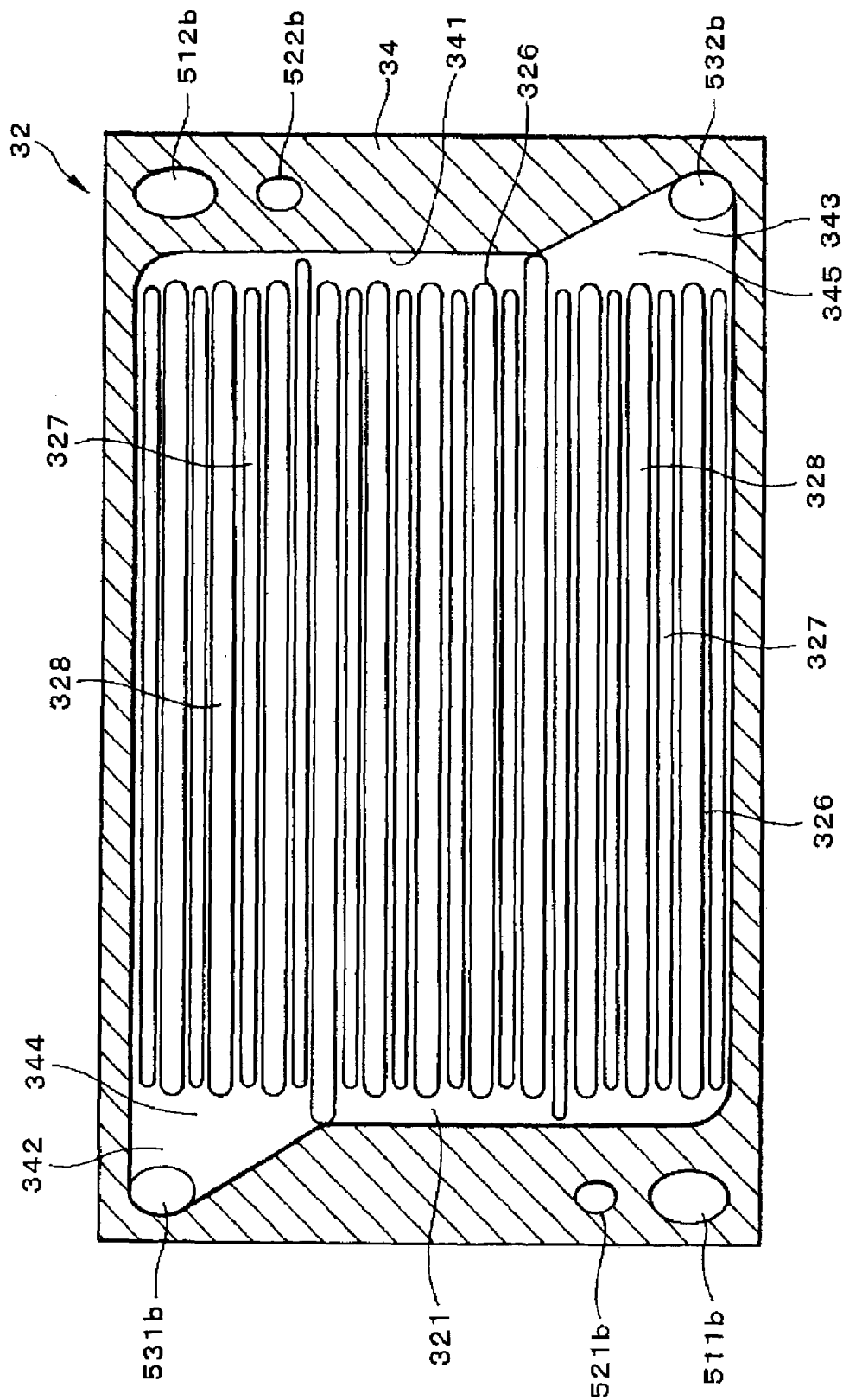
FIG. 5 is a cross-section taken along line C-C in FIG. 1.

FIG. 5 is a C-C cross section of FIG. 1. On a back surface of the current collecting member 32, back surface-lifted portions 326 protruding from a back side surface of the plane portion 321 are formed and grooves 327 are formed therebetween. The front surface-lifted portions 323 and the back surface-lifted portions 326 are in inextricable relation, wherein back sides of the front surface-lifted portions 323 serve as the grooves 327, while front sides of the back surface-lifted portions 326 serve as the grooves 325. Cross-sectional shapes of the current collecting member 32 have such wavy shapes at the anode-abutting portion 322 that the lifted portions 323, 326 extrude on the front side (anode side) as well as on the back side thereof. Therefore, the back surface-lifted portions 326 are formed successively in linear-shapes similarly to the front surface-lifted portions 323 and provided along a long edge direction of the current collecting member 32. The thus-formed plural back surface-lifted portions 326 are arranged at even intervals along a short edge of the current collecting member 32. Tip portions in a protruding direction of the back surface-lifted portions 326 serve as abutting surfaces 328 abutting on the back surface of the current collecting member 31.

On the current collecting member 32, an oxygen flowing-out hole 511b, a hydrogen flowing-out hole 521b, a coolant flowing-out hole 531b, an oxygen flowing-in hole 512b, a hydrogen flowing-in hole 522b, and a coolant flowing-in hole 532b are formed on the same positions as the current collecting portion 31, respectively.

The current collecting members 31, 32 are made of metal plates so that the lifted portions 313, the front-surface-lifted portions 323, and the back surface-lifted portions 326, which are formed on each current collecting member 31, 32, can be easily formed by, for example, presswork or the like. Such holes as the oxygen flowing-out hole 511a can be also formed by a punching process at a low price, which allows to reduce a total manufacturing cost. Additionally, the current collecting members 31, 32 are made of plate materials, which enables to have thin shapes.

The above-structured current collecting members 31, 32 are formed into rectangles with the same size and shape, and they are stacked with back surfaces thereof facing to each other. The abutting surfaces 328 abut on the back surface of the current collecting member 31, which makes it possible for the separator 3 to take such a structure that the cathode and the anode of the unit cell 2, each of which adjacent to each other, can be connected in a current-carrying state. A coolant gasket 34 is interposed between the current collecting members 31, 32, while an oxygen gasket 33 is interposed between the current collecting member 31 and the unit cell 2 and a hydrogen gasket 35 is interposed between the current collecting member 32 and the unit cell 2.

An outline shape of each gasket 33, 34, 35 is all formed into a rectangle and each thereof is structured to have the same shape as the current collecting members 31, 32. Each of the gaskets 33, 34, 35 is formed into a frame-shape along a peripheral edge of each current collecting member 31, 32, and the same holes as the oxygen flowing-out holes 511(a), 511(b), the hydrogen flowing-out holes 521(a), 521(b), the coolant flowing-out holes 531(a), 531(b), the oxygen flowing-in holes 512(a), 512(b), the hydrogen flowing-in holes 522(a), 522(b), and the coolant flowing-in holes 532(a), 532(b) are formed on the same position as they are formed on each current collecting member 31, 32. Further, each of the gaskets 33, 34, 35 is made of an insulating material.

The oxygen gasket 33 is formed with thickness of protruding height of the lifted portions 313 of the current collecting member 31 and thickness of the cathode 21 of the unit cell 2 combined. A space is formed by a front surface of the current collecting member 31, a front surface of the cathode 21, and an inner circumferential end surface 331 of the oxygen gasket 33 with the current collecting member 31, the oxygen gasket 333, and the unit cell 2 being stacked, and this space serves as an oxygen holding portion 41 in which oxygen is filled. The oxygen gasket 33 comprises a pass 332 for communicating between the oxygen flowing-out hole 511a and the oxygen holding portion 41 and a pass 333 for communicating between the oxygen flowing-in hole 512a and the oxygen holding portion 41, and in end portions facing the oxygen holding portion 41, an oxygen flowing-out port 334 and an oxygen flowing-in port 335 are formed on the passes 332, 333, respectively.

The hydrogen gasket 35 is formed with thickness of protruding height of the front surface-lifted portions 323 of the current collecting member 32 and thickness of the anode 22 of the unit cell 2 combined. A space is formed by a front surface of the current collecting member 32, a front surface of the anode 22, and an inner circumferential end surface 351 of the hydrogen gasket 35 with the current collecting member 32, the hydrogen gasket 35, and the unit cell 2 being stacked, and this space serves as a hydrogen holding portion 42 in which hydrogen is filled. The hydrogen gasket 35 comprises a pass 352 for communicating between the hydrogen flowing-out hole 521b and the hydrogen holding portion 42 and a pass 353 for communicating between the hydrogen flowing-in hole 522b and the hydrogen holding portion 42, and in end portions facing the hydrogen holding portion 42, a hydrogen flowing-out port 354 and a hydrogen flowing-in port 355 are formed on the passes 352, 353, respectively.

The coolant gasket 34 is formed with a thickness equal to the protruding height of the back surface-lifted portions 326 of the current collecting member 32. A space is formed by the back surface of the current collecting member 31, the back surface of the current collecting member 32, and an inner circumferential end surface 341 of the coolant gasket 34 sandwiched therebetween, and this space serves as a coolant holding portion 43 in which coolant is filled. The coolant holding portion 43 is so installed as to hold as much capacity of the coolant as possible by the plural grooves 316 formed on the back surface of the current collecting member 31 and the plural grooves 327 formed on the back surface of the current collecting member 32. This means that spaces (grooves 316, 327) formed on the back side of each lifted portion 313, 323 are utilized to secure the capacity for holding the coolant as much as possible, which enables to improve cooling efficiency with keeping thickness of the separator thin.

In addition, the grooves 316 and the grooves 327 are arranged orthogonal to each other, so that the coolant passing through the coolant holding portion 43 is caused to have such flow as flowing in a vertical direction along the grooves 316 and such flow as flowing in a horizontal direction along the grooves 327, and then these flow crosses each other. Since such flow occurs therein, the coolant is caused not to have single flow that simply flows from a flowing-in port to a flowing-out port, but to receive appropriate resistance when the coolant passing therethrough, and thus the coolant diffuses uniformly in all over the separator 3, which allows to cool each portion of the separator 3 more uniformly. The coolant gasket 34 comprises a pass 342 for communicating between the coolant flowing-out hole 531b and the coolant holding portion 43 and a pass 343 for communicating between the coolant flowing-in hole 532b and the coolant holding portion 43, and in end portions facing the coolant holding portion 43, a coolant flowing-out port 344 and a coolant flowing-in port 345 are formed on the passes 342, 343, respectively.

Figure 6:
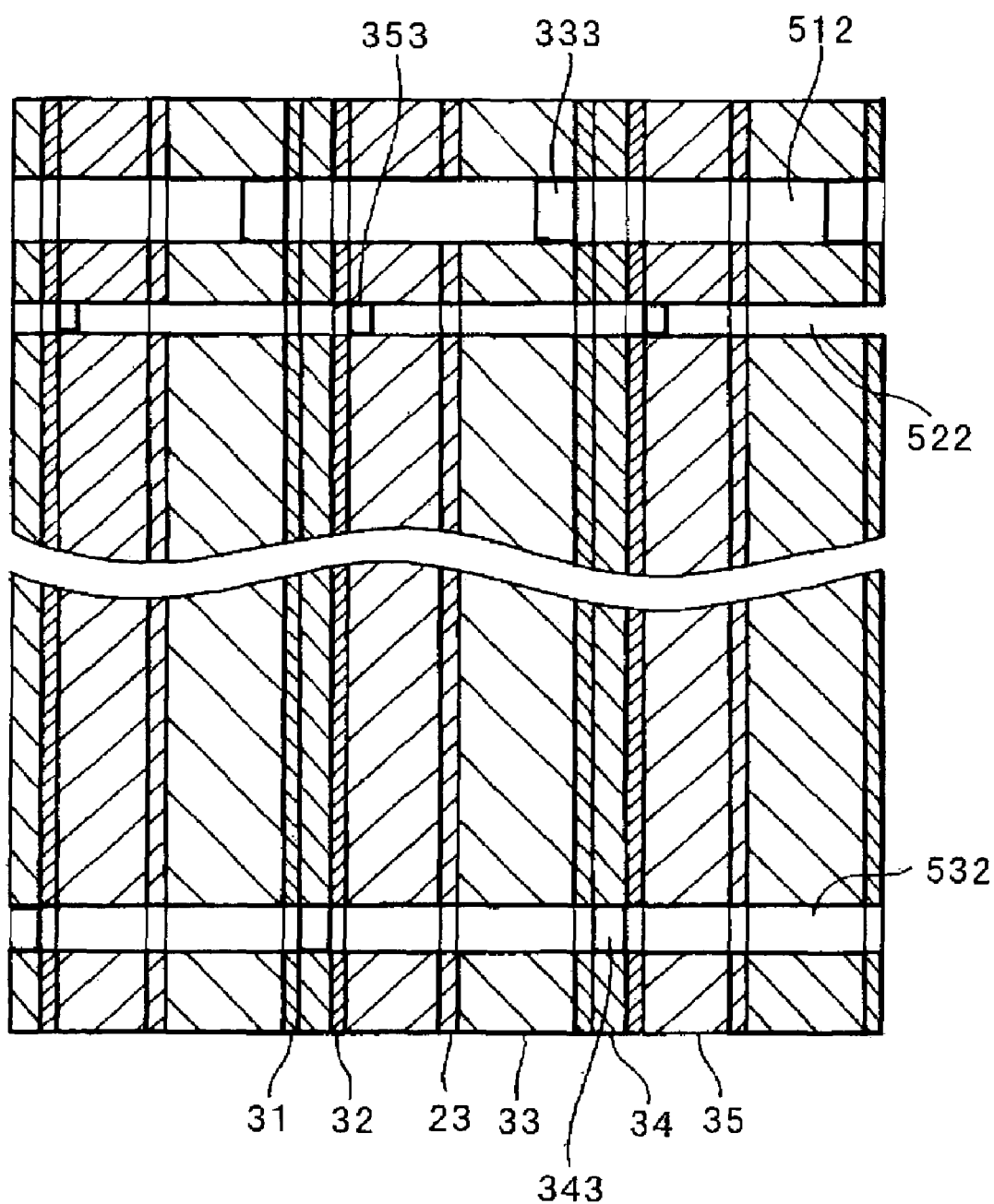
FIG. 6 is a cross-section taken along line D-D in FIG. 1.

FIG. 6 is a D-D cross section of the fuel cell stack 1 in FIG. 3. When the unit cell 2 and the separator 3 are stacked, as shown in FIG. 6, an oxygen discharge pass 511, a hydrogen discharge pass 521, a coolant discharge pass 531, an oxygen supply pass 512, a hydrogen supply pass 522, and a coolant supply pass 532 are formed by the oxygen flowing-out holes 511(a), 511(b), the hydrogen flowing-out holes 521(a), 521(b), the coolant flowing-out holes 531(a), 531(b), the oxygen flowing-in holes 512(a), 512(b), the hydrogen flowing-in holes 522(a), (b), and the coolant flowing-out holes 532(a), 532(b), each of which is formed on the same position. The oxygen supply pass 512 communicates with the pass 333 that communicates with the oxygen holding potion 41, the hydrogen supply pass 522 communicates with the pass 353 that communicates with the hydrogen holding potion 42, and the coolant supply pass 532 communicates with the pass 343 that communicates with the coolant holding portion 43. This oxygen supply pass 512 and the plural passes 333 compose an oxygen manihold, the hydrogen supply pass 522 and the plural passes 353 compose a hydrogen manihold, and the coolant supply pass 532 and the passes 343 compose a coolant manihold.

The oxygen discharge pass 511, the hydrogen discharge pass 521, and the coolant discharge pass 531 similarly communicate with the passes 332, 352, 342, respectively.

Figure 7:
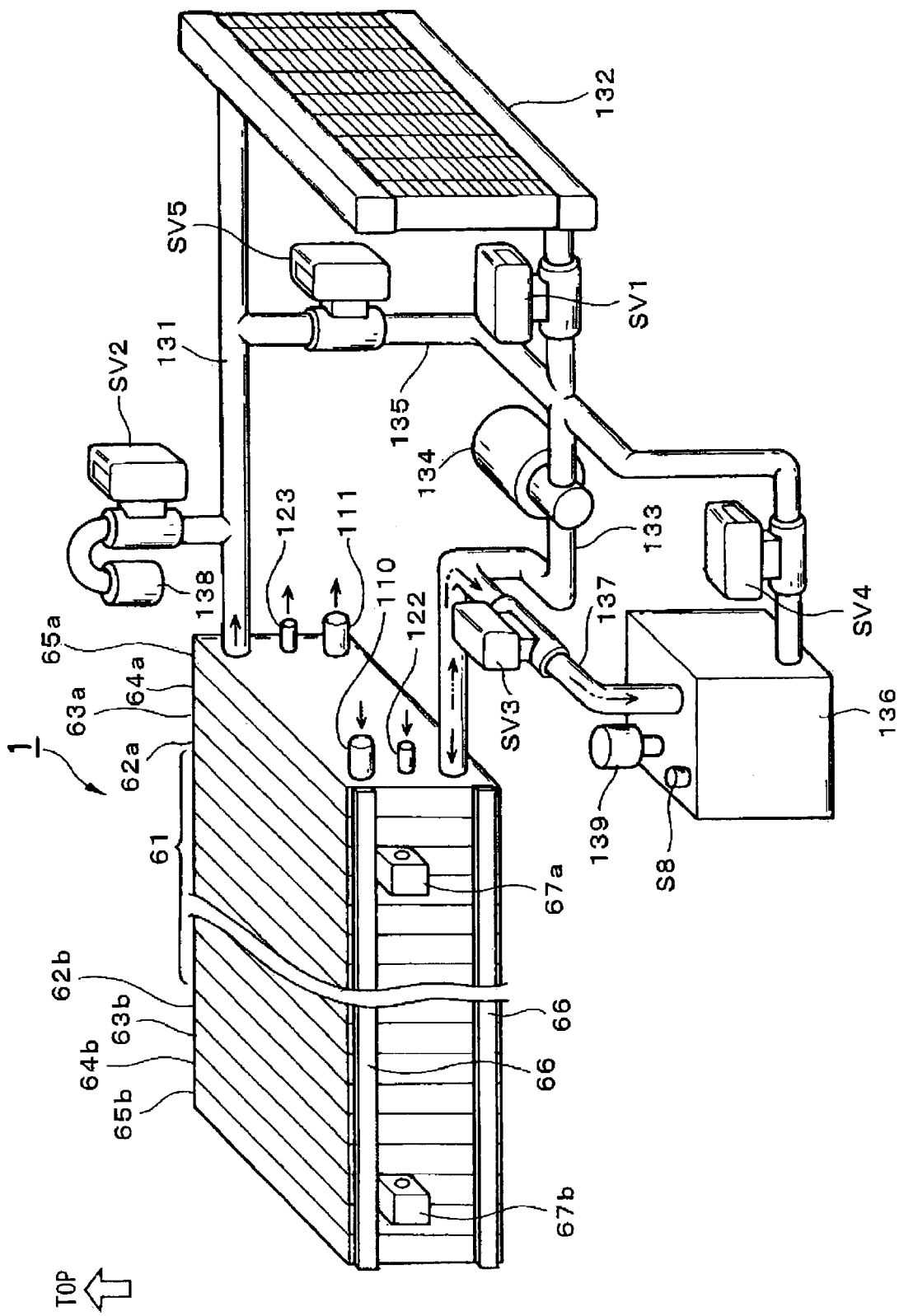
FIG. 7 is a perspective view of the whole fuel cell stack.

FIG. 7 is a whole perspective view showing the fuel cell stack 1. As shown in FIG. 7, the above-structured unit cell 2 and separator 3 are layered alternately to compose a power-generating portion 61. On both ends of the power-generating portion 61, heat conductive adjusting members 62a, 62b, current collectors 63a, 63b, insulating members 64a, 64b, and end plates 65a, 65b each are outwardly connected to both ends thereof, while on side surfaces facing thereto, a pair of holding members 66 for holding thus-layered members as one unit is provided on respective ends.

Figure 8:
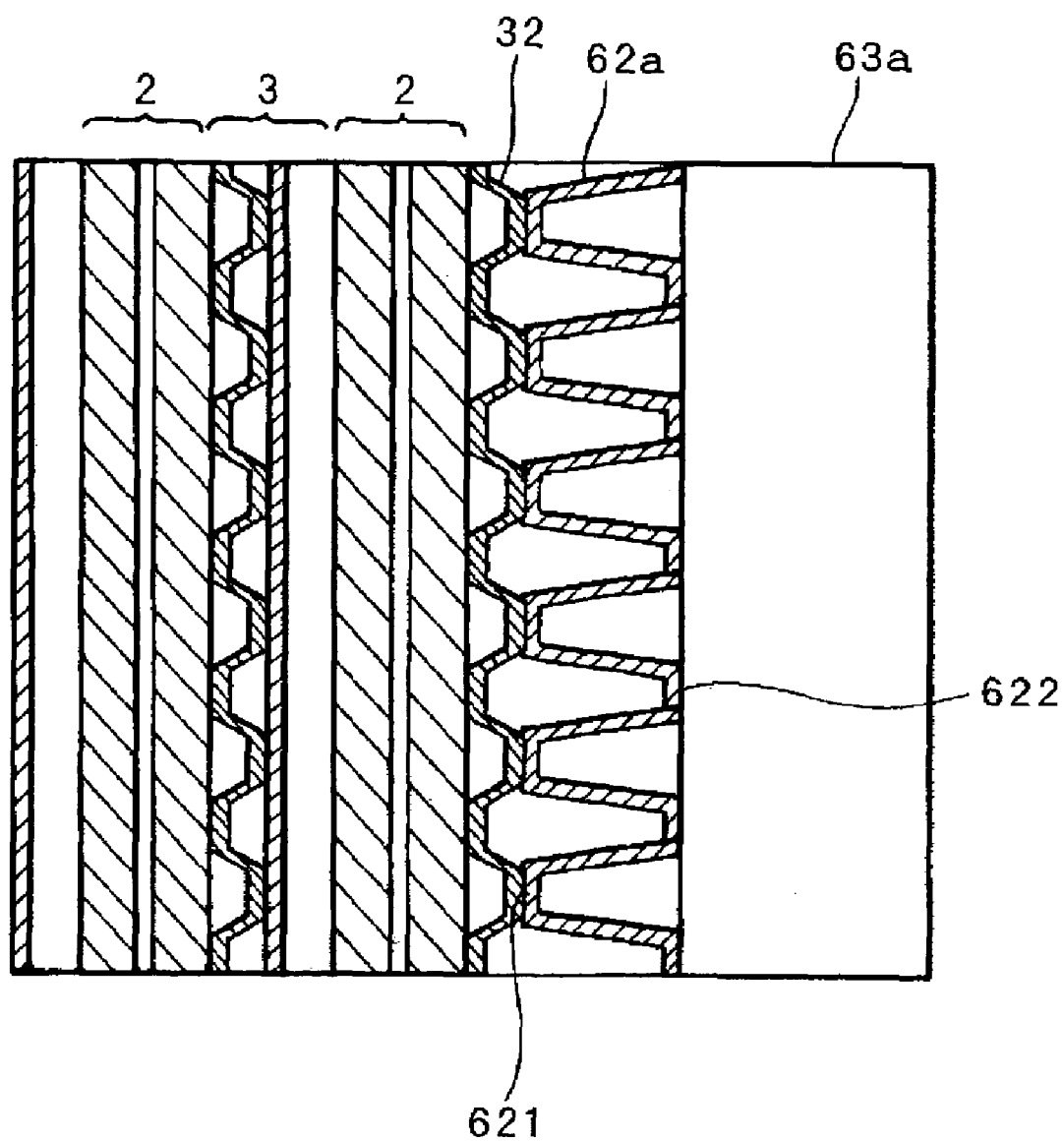
FIG. 8 is a view of a partial cross-section of the fuel cell stack.

FIG. 8 is a side view of a partial cross section of the fuel cell stack 1 showing the heat conductive adjusting member 62a. This heat conductive adjusting member 62a electrically connects the separator 3 and the current collector 63a. Metal that is superior in electric conductivity such as copper is used for the current collector 63a. The heat conductive adjusting member 62a is made of a conductive material and its cross-sectional shape is formed into a wavy one, in which top portions 621 of the wavy shape are connected to the current collecting member 32 of the separator 3 and troughs 622 are connected to the current collector 63a.

In addition, the heat conductive adjusting member 62a operates to inhibit heat conduction from the current collecting member 32 lying in the endmost position of the fuel cell stack 1 to outside. Further, an electric conductive material (for example, metal) is used for the heat conductive adjusting member 62a to electrically connect the current collecting member 32 and the current collector 63a. Further, the heat conductive adjusting member 62a is structured to have its plate material wave-formed for the purpose of reducing its volume, which may contribute to reducing size of a heat migration path in order to inhibit heat conductivity, and making heat capacity of the heat conductive adjusting member 62a itself small in order to lessen a heat quantity that is drawn from the power-generating portion 61. Such a structure allows to electrically connect the current collecting member 32 and the current collector 63a, while achieving to lessen heat conduction quantity from the current collecting member 32 to the current collector 63a. The present embodiment takes a wavy shape as an example, but other structures may be applied thereto if they operate to inhibit the heat migration from the current collecting member 32 to the current collector 63a. For example, porous conductive materials such as a foam metal and a porous carbon material, or a conductive resin may be employed.

Note that the heat conductive adjusting member 62b, which is provided on an opposite side of the power-generating portion 61, is connected to the current collecting member 31 and the other structures are the same as those of the heat conductive adjusting member 62a.

Figure 9:
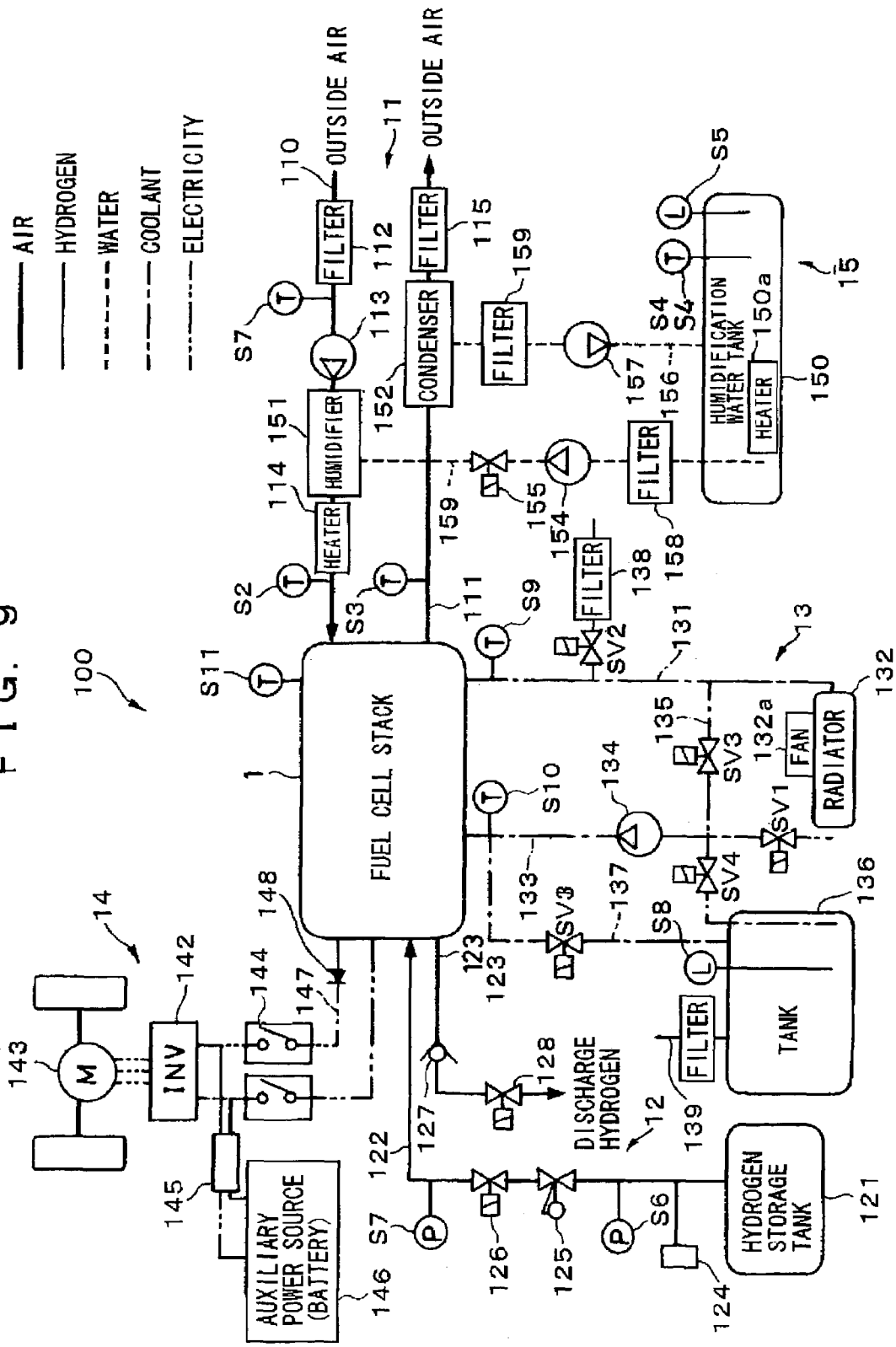
FIG. 9 is a schematic view of the structure of a fuel cell system.

Next, a structure of a fuel cell system 100 using the fuel cell stack 1 therein will be described. FIG. 9 is a schematic view showing the structure of the fuel cell system 100. The fuel cell stack 100 is supposed to be mounted on an electric car and it composes a power source of a driving motor 143 together with a later-described battery 146 in a load system. The fuel cell system 100 comprises an air supply system 11 that supplies air to the fuel cell stack 1, a hydrogen supply system 12 that supplies hydrogen to the same, a cooling system 13 that supplies coolant to the same, a load system 14, and a humidification system 15 that supplies water to the oxygen supply system 11.

The air supply system 11 comprises an air supply pass 110 and an air discharge pass 111. Connected to the air supply pass 110 are, in order from upstream side, a filter 112 for removing impurities such as outside air dust, an outside air-temperature sensor S1, an air supply fan 113 for adjusting an air amount to be supplied, a humidifier 151 for humidifying air to be supplied, a heater 114, an air-inlet temperature sensor S2, and finally connected thereto is the oxygen supply pass 512 of the fuel cell stack 1.

The outside air-temperature sensor S1 detects temperature of air to be supplied, and when this temperature turns out to be lower than specified temperature, the heater 114 can increase the temperature of the air supplied. This means that the heater 114 is controlled by an output value of the air-inlet temperature sensor S1.

An end of an upstream side of the air discharge pass 111 is connected to the oxygen discharge pass 511 of the fuel cell stack 1, and connected to the air discharge pass 111 are, in order toward downstream side, an air-outlet temperature sensor S3 for measuring representative temperature of the fuel cell stack, a condenser 152 for recovering from the air supply system water that is carried away by air stream from the cathode 21, and a filter 115 for preventing impurities from flowing back from the outside to enter the fuel cell stack, and finally air is discharged to the outside of the system. As described above, the air supply system 11 sends air to the oxygen holding portion 41 that is provided in the fuel cell stack 1 and supplies the cathode 21 with oxygen in the air.

The humidification system 15 comprises the humidifier 151 for humidifying air supplied to the fuel cell stack 1, the condenser 152 for recovering moisture from the air discharged, a humidification water tank 150, a water supply pass 153 for supplying humidification water from the humidification water tank 150 to the humidifier 151, a humidification water pump 154 for sending the humidification water to the humidifier 151, an electromagnetic valve 155 provided in a downstream side of the humidification water pump 154, a recovery pass 156 for recovering water, which has been recovered in the condenser 152, into the humidification water tank 150, a recovery pump 157 for sending the recovered water into the humidification water tank 150, an antiicing heater 150a provided in the humidification water tank 150, a humidification water temperature sensor S4 for detecting temperature of the humidification water in the humidification water tank 150, and a humidification water level sensor S5 for detecting a water level of the same. In the water supply pass 153 and the recovery pass 156, filters 158, 159 are provided respectively to remove impurities. The electromagnetic valve 155 is closed when the pump 154 is not driven to prevent water flow in the pass. The humidification system 15 is provided to humidify air sent to the fuel cell stack 1. The air humidified with the humidifier 151 in this humidification system 15 keeps the cathode 21 of the fuel cell stack 1 in a moist state (a state moistened with moisture).

The hydrogen supply system 12 comprises a hydrogen storage tank 121, a supply pass 122 for supplying hydrogen to the hydrogen supply pass 522 in the fuel cell stack 1, and a discharge pass 123 for discharging hydrogen from the hydrogen discharge pass 521 in the fuel cell stack 1 to outside. Connected to the supply pass 122 are a hydrogen filling port 124 for filing hydrogen from an outside hydrogen source to the hydrogen storage tank 121 and a hydrogen primary pressure sensor S6 for measuring a hydrogen pressure in the hydrogen storage tank 121, and a hydrogen regulator 125 for adjusting pressure (amount) of hydrogen supplied to the anode, a hydrogen supply electromagnetic valve 126 for controlling a hydrogen amount to be supplied, and a hydrogen secondary pressure sensor S7 for measuring hydrogen pressure applied to the anode are connected thereto in order toward a downstream side. The hydrogen regulator 125 and the hydrogen supply electromagnetic valve 126 are controlled based on their detected value by the hydrogen secondary pressure sensor S7. Further, a check valve 127 for preventing back flow and a hydrogen discharge electromagnetic valve 128 for controlling hydrogen discharge are connected to the discharge pass 123 in order toward a downstream side. Hydrogen may be supplied either successively or intermittently during the operation.

The load system 14 draws output of the fuel cell stack 1 from a code 147, which is connected to contact buttons 67a, 67b, to outside via an inverter 142. This output enables to drive a load such as a motor 143. In this load system 14, a diode 148 for preventing a reverse current and a relay 144 as a switch are provided. In the load system 14, a battery 146 is also connected between the relay 144 and the inverter 142 via an output control circuit 145. The battery 146 stores a regenerative current of the motor 143 to supplement the output in a case of being deficient in output of the fuel cell. The battery 146 may be other storage device such as a capacitor.

The cooling system 13 is arranged to prevent the fuel cell stack 1 from being overheated with high temperature and it cools the fuel cell stack 1 by circulating the coolant that passes through the fuel cell stack 1. In this embodiment, an antifreeze liquid, for example, ethylene glycol water solution is used as the coolant. In addition, water and the other heat media can be used as the coolant. Temperature of the fuel cell stack 1 can be detected, for example, by a temperature sensor 11 installed in the fuel cell stack 1.

The cooling system 13 is basically structured with a coolant discharge pass 131 connected to the coolant discharge pass 531 in the fuel cell stack 1, a radiator 132, and a coolant supply pass 133, and the coolant is sent to the coolant supply pass 532 in the fuel cell stack 1 by a circulation pump 134 arranged in the coolant supply pass 133. A radiator by-pass pass 135, which by-passes the radiator 132, is connected between the coolant discharge pass 131 and the coolant supply pass 133. A tank 136 in which the coolant is stored is connected to the circulation pump 134 via an electromagnetic valve SV4.

In addition, a coolant recovery pass (discharge pass) 137 is connected for recovering the coolant temporarily into the tank 136 especially when starting under low temperature or the like. In the cooling system, further connected are an outside air-introducing valve SV2 for opening and shutting an outside air-introducing pass when recovering the coolant into the tank 136 and a filter 138 for removing impurities from the outside air introduced. The outside air-introducing valve SV2 is arranged in a position higher than the fuel cell stack 1 in a gravity direction. Arranging in such a position facilitates introducing the outside air into the discharge pass 131 when the electromagnetic valve SV2 is opened. The tank 136 is positioned below the fuel cell stack 1 in a gravity direction. Further, the circulation pump 134 is positioned in a lower position in a gravity direction than a solution level of the coolant accommodated in the tank 136.

Due to the above-described structure, opening the outside air-introducing valve SV2 allows to introduce the outside air into the coolant holding portion 43 of the fuel cell stack 1, which causes the coolant in the coolant holding portion 43 to flow down into the tank 136 with its own weight. This means that installation of a pump or the like for recovering the coolant is not required. The coolant flows out from the coolant flowing-in port 345, which is positioned at a bottom end portion in the coolant holding portion 43, and is recovered in the tank 136 through the coolant supply pass 532, the coolant supply pass 133, and the coolant recovery pass 137. The above passes of the coolant, which are passed through when the coolant is recovered, are arranged in a lower or the same position in a gravity direction in the above order.

In addition, a ventilation pipe 139 comprising a water level sensor S8, which decides whether the coolant is recovered or not, or the coolant is supplied or not, and comprising a filter is installed in the tank 136. Opening and shutting of the electromagnetic valves SV1, SV2, SV3, SV4, and SV5 is controlled depending on temperature of the coolant, which is detected by a coolant outlet temperature sensor S9 and a coolant inlet temperature sensor S10 arranged in the coolant discharge pass 131 and the coolant supply pass 133 respectively, and thus flow of the coolant in the cooling system 13 is controlled. A fan 132a is provided to the radiator 132 so that adjusting an air volume of the fan can adjust cooling capability.

As described above, the cooling system 13 operates to prevent the fuel cell from overheating with heat of reaction under normal power generation of the fuel cell. In this case, the cooling system 13 uses a circulation system comprising the coolant discharge pass 131, the radiator 132, the coolant supply pass 133, and the circulation pump 134 that is arranged in the coolant supply pass 133. Therefore, in this case, the electromagnetic valve SV1 is opened, while the electromagnetic valves SV2 to SV5 are closed. The coolant passes through from the coolant supply pass 133, the coolant supply pass 532, the coolant holding portions 43 of respective separators 3, and the coolant discharge pass 531 in the fuel cell stack 1 to undergo heat exchange, and the heat-exchanged coolant reaches the radiator 132 through the coolant discharge pass 131 to be cooled in the radiator 132 and returns to the circulation pump 134 via the electromagnetic valve SV1. According to a gap between the temperature of the coolant detected in the coolant inlet temperature sensor S10 and the temperature of the discharged coolant detected in the coolant outlet temperature sensor S9, cooling capability of the radiator 132 is adjusted and a discharge volume from the circulation pump 134 is adjusted to maintain the fuel cell stack 1 with moderate temperature.

Figure 10:
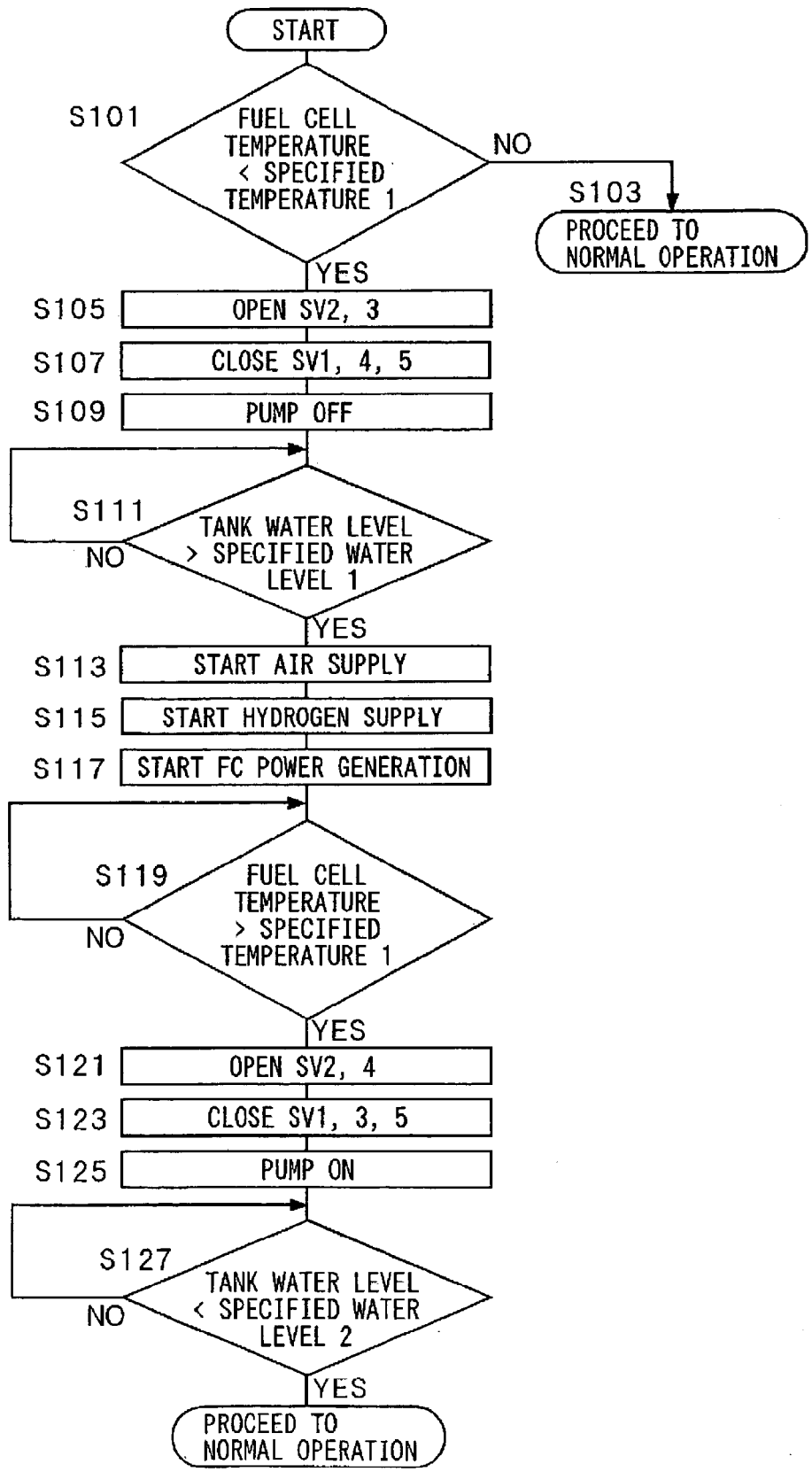
FIG. 10 is a flow chart showing an operation of a cooling system on activation of power generation.

In the above-structured fuel cell system 100, operation on which the fuel cell stack starts to generate power will be described according to a flow chart shown in FIG. 10.

A temperature sensor S11 of the fuel cell stack 1 decides whether temperature of the fuel cell is below specified temperature 1 or not. (step S101) Here, the specified temperature 1 designates temperature lower than temperature with which the fuel cell can run optimally. For example, the specified temperature 1 can be set at 50° C. at which the fuel cell is required to be cooled when it runs to generate power. The temperature of the fuel cell can also be detected by the air-outlet temperature sensor S3 provided in the air discharge pass 9, in addition to the temperature sensor 11. When the temperature of the fuel cell is at or above the specified temperature 1, a process passes to S103 to perform normal operation. When the temperature of the fuel cell is below the specified temperature 1, the electromagnetic valves SV2, SV3 are opened (step S105), while the electromagnetic valves SV1, SV4, and SV5 are closed (step S107). On the other hand, the circulation pump 134 is turned off (step S109). Due to the operation in the steps S105 to S109, the coolant in the fuel cell stack 1 flows out from the fuel cell stack 1 by its own weight to flow into the tank 136. As a result, the coolant filled in the coolant holding portion 43 in the separator 3 is discharged so that the coolant holding portion 43 is emptied, which results in decreasing total heat capacity of the fuel cell stack 1 by a quantity corresponding to a discharged quantity of the coolant. That is, the coolant in the coolant holding portion 43 is exchanged with air having smaller specific heat.

In this case, in a state before the fuel cell starts to generate power in terms of time, that is, when the fuel cell is in an OFF-state, the coolant is filled in the fuel cell stack and this coolant is discharged when it starts to generate power. This is because since preventing the fuel cell from freezing becomes an issue on starting power generation, it is sufficient to discharge the coolant when starting the power generation is decided. Granting that the coolant is discharged when the fuel cell is shut down, it is uncertain that this causes a difficulty in starting power generation on the next power generation start. Therefore, in this embodiment, the coolant is not discharged when the fuel cell is shut down. Thereby in this embodiment, the heat capacity of the fuel cell stack is reduced when the fuel cell is started to generate power (a case of trying to start in the cold, or in a case of a fuel cell car, a case of trying to generate power of a vehicle by, for example, turning a member corresponding to an ignition key in a switch), i.e. reduced to less than that in a state when the fuel cell is turned off or a state of power generation halt, a state of being left unattended for a long time without any plan of generating power, or in a case of the fuel cell car, a state when the driver is away from the vehicle without a plan to drive it.

It is decided whether a water level of the tank 136, which is detected by a water level sensor S8, reaches a specified water level 1 (step S111). If the water level thereof has not reached it, the states of the steps S105 to 109 are maintained. The specified water level 1 designates a water level after a quantity of the coolant is increased by a quantity corresponding to the coolant filled in the fuel cell stack 1. A fact that the quantity of the coolant is increased by the quantity corresponding to the coolant filled therein means that the coolant is taken out from the fuel cell stack 1.

When the specified water level 1 is reached, which means that a process of taking out the coolant is completed, a preparation for the fuel cell to generate power is started. That is, the air fan 113 is driven to start air supply to the fuel cell stack 1 (step S113). Next, the hydrogen supply electromagnetic valve 126 is opened to start hydrogen supply to the fuel cell stack 1 (step S115). Such the operation causes in the fuel cell stack 1 to supply air including oxygen to the oxygen holding portion 41, to supply hydrogen gas to the hydrogen holding portion 42, to start power generating reaction in the unit cell 2, and thus to start power generation of the fuel cell (step S117). Here, since the coolant has been taken out, the heat capacity of the fuel cell stack 1 is made less than that in normal power generation, so that heat generated by the power generating reaction is not absorbed in the coolant. That is, the heat of reaction is utilized as heat to warm up the fuel cell stack 1, which results in shortening time to increase the temperature of the fuel cell stack 1. Therefore, even when temperature of the fuel cell stack 1 is below the freezing point, water generated by the power generating reaction is prevented from freezing in the unit cell 2, which allows to avoid decrease in power generating efficiency on starting power generation.

Additionally, air is filled in the coolant holding portion 43 and the fuel cell stack 1 discharges the coolant so that, unlike with the shut down period, the fuel cell stack 1 expands its surface area in contact with the air (gas) to have such a state that a heat release amount is decreased compared to a case when it is filled with liquid. Therefore, heat migration to media (air and coolant) in the coolant-holding portion 43 is inhibited to further shorten a time for increasing the temperature.

Further, the fuel cell stack 1 is caused to have such a structure that a heat conduction path of the heat of reaction generated in the unit cell 2 is changed only to the separator 3 since its heat conduction path to the coolant is vanished. Thereby, fast heat conduction is achieved and the temperature of the whole fuel cell stack 1 can be further quickly increased.

Next, whether the temperature of the fuel cell stack 1 goes over the specified temperature 1 is decided (step S119). When the specified temperature 1 is not reached, steps S113 to 117 are maintained. When it is reached, meaning that the temperature of the fuel cell stack 1 has increased to temperature that requires to be cooled, a preparation for the cooling system 13 to cool the fuel cell stack 1 is started. Concretely, the coolant is filled in the fuel cell stack 1. The electromagnetic valves SV2, SV4 are opened (step S121), while the electromagnetic valves SV1, SV3, and SV5 are closed (step S123). Further, the circulation pump 134 is driven (step S125).

The coolant is supplied from the coolant supply pass 133 to the fuel cell stack 1, while the coolant is filled in the coolant holding portion 43 by driving the circulation pump 134. The coolant is filled, while the air in the coolant holding portion 43 is discharged to the outside of the fuel cell stack 1 through the coolant discharge pass 531 to be further discharged to the outside of the cooling system 13 via the electromagnetic valve SV2.

Whether the water level of the tank 136 becomes a specified water level 2 or below is decided (step S127). The specified water level 2 designates the water level in the tank 136 when the coolant is filled in the coolant-holding portion 43 of the fuel cells stack 1. When the water level of the tank 136 does not reach the specified water level 2 or below, steps S121 to 125 are maintained, while when it reaches the specified water level 2 or below, a normal cooling operation is started.

As described above, in this embodiment, the coolant is discharged at a stage in which starting of the fuel cell is determined. In this embodiment, as the coolant, a so-called antifreeze liquid, which freezes at lower temperature than normal water (freezing starts at zero degree centigrade), is used. This is because the antifreeze liquid may lower a possibility that freezing of water causes to generate breakage in the cooling system. Therefore, it is not necessary to discharge the coolant when the fuel cell is turned off in consideration of the breakage due to freezing. In this embodiment, the antifreeze liquid is used as the coolant, but normal so-called water may be used, and especially pure water may be used as cooling water.

Figure 11:
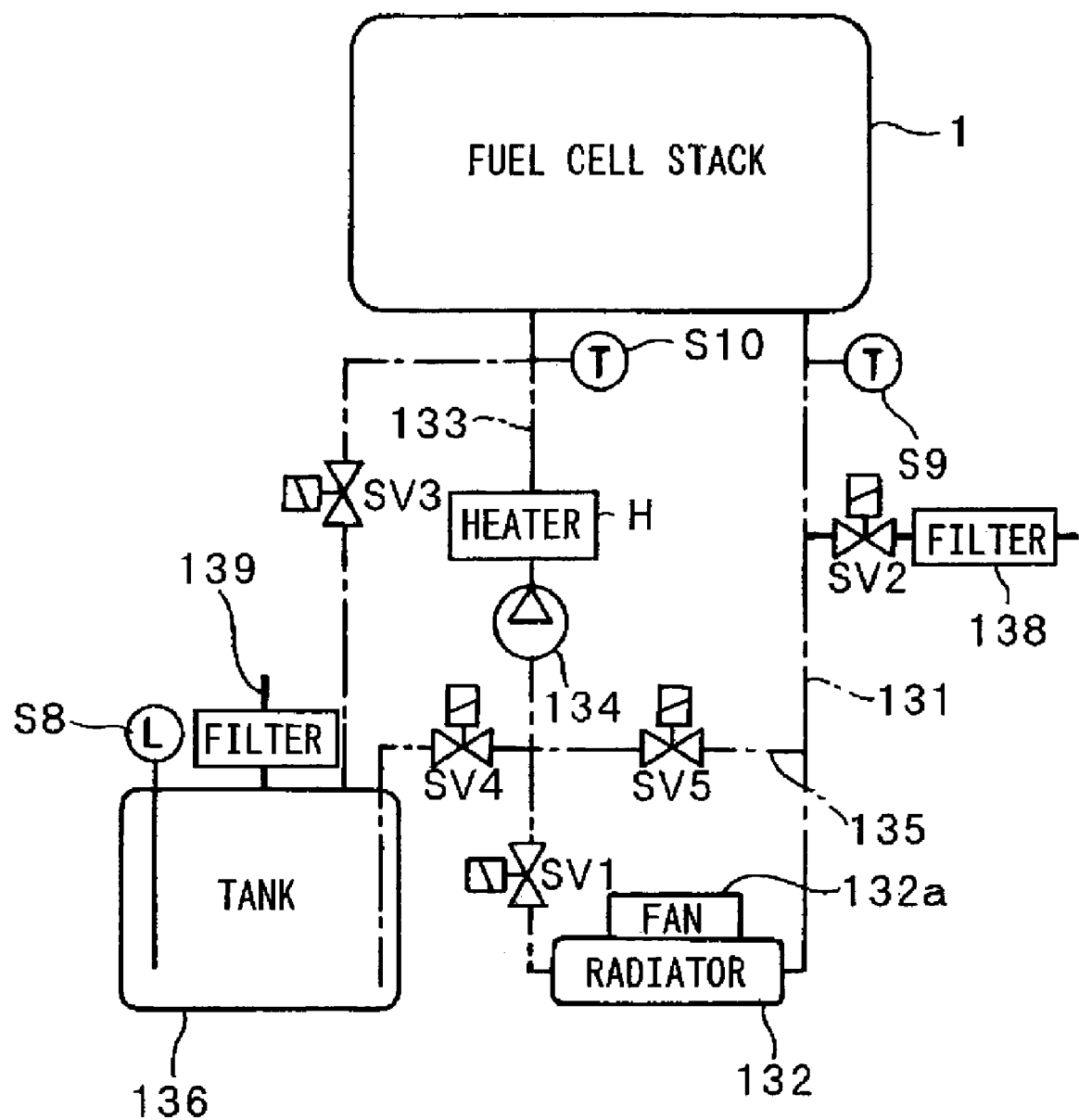
FIG. 11 is a schematic view showing another embodiment of the cooling system.

Besides the above-described cooling system 13, such a structure that a heating means for heating the fuel cell stack 1 on starting the power generation may be employed. FIG. 11 is a schematic view showing a structure of the cooling system 13 in which a heater H is provided. The heater H is provided in the coolant supply pass 133 and located between the circulation pump 134 and the fuel cell stack 1. Since other structures are same as a first embodiment shown in FIG. 9, description thereof is omitted. The heater H operates to heat the coolant flowing in the coolant supply pass 133. The thus-heated coolant passes through the coolant-holding portions 43 that are provided on the respective separators 3 in the fuel cell stack 1, to thereby increase the temperature of the fuel cell stack 1.

Figure 12:
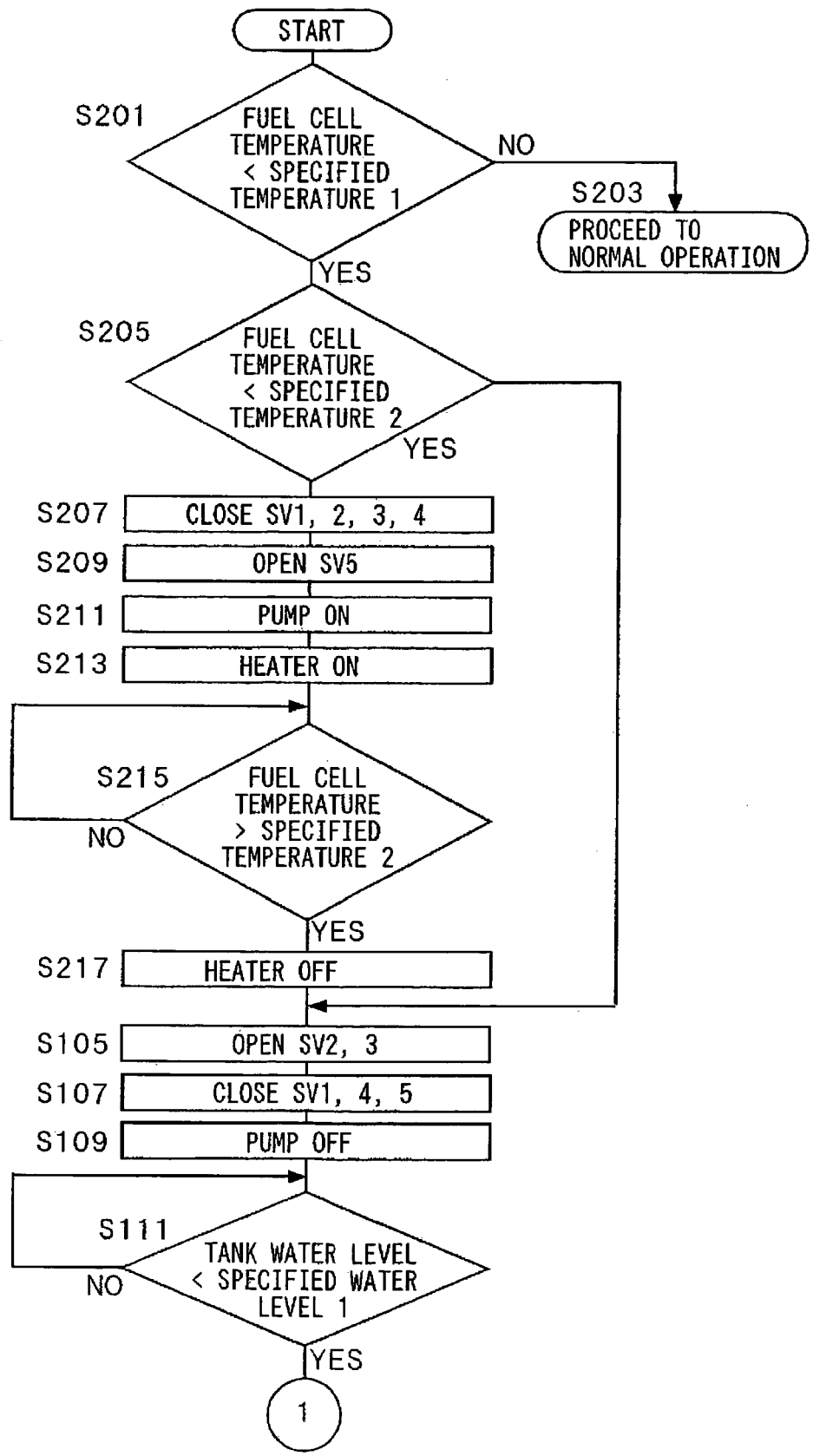
FIG. 12 is a flow chart showing the operation of the cooling system on activation of the power generation.
Figure 13:
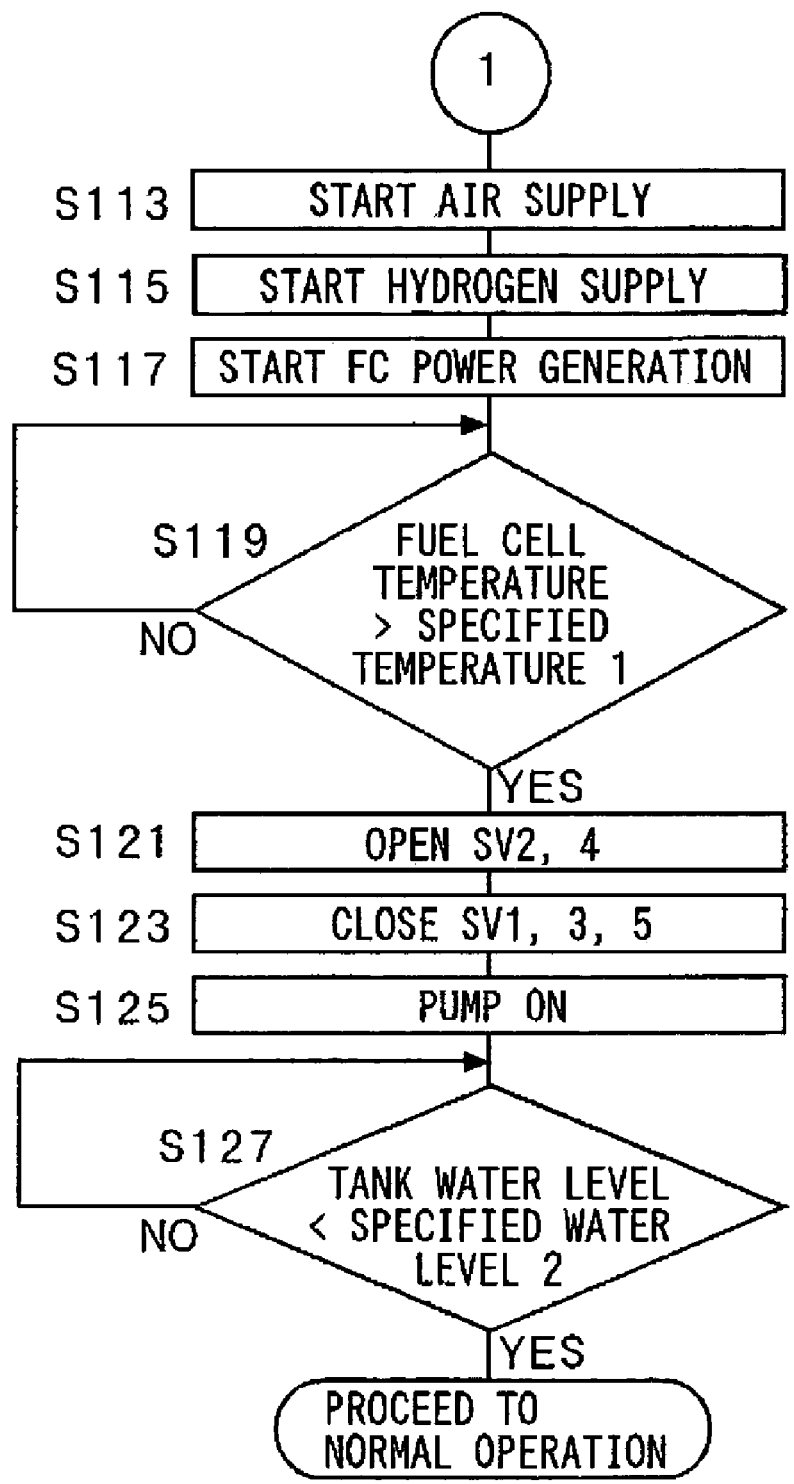
FIG. 13 is a flow chart showing the operation of the cooling system on activation of the power generation.
Figure 14:
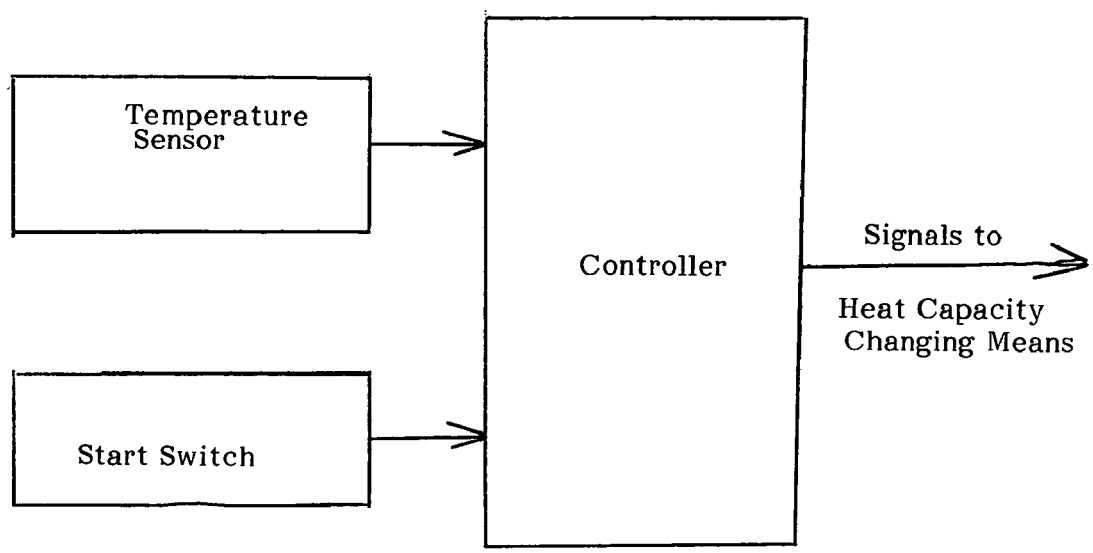
FIG. 14 is a block diagram of the controller.

Hereinafter, operation of the cooling system of the above-described second embodiment will be explained based on flow charts in FIG. 11 and FIG. 12. In this embodiment, when temperature of the fuel cell is equal to self-startable temperature or below, the heater H is driven to increase the temperature of the fuel cell up to the self-startable temperature by heating to circulate the coolant. When the temperature of the fuel cell reaches the self-startable temperature or above, the same operation as the first embodiment is performed.

On startup, whether a value detected by the temperature sensor S11, which measures the temperature of the fuel cell stack 1, is below the specified temperature 1 is decided (step S201). Here, the specified temperature 1 designates temperature lower than temperature at which the fuel cell can run optimally. For example, the specified temperature 1 can be set at 50° C. at which the fuel cell is required to be cooled when it runs to generate power. The temperature of the fuel cell can also be detected by the air-outlet temperature sensor S3 provided in the air discharge pass 111. When the temperature of the fuel cell is at or above the specified temperature 1, a process passes to a S203 to perform normal operation. When the temperature of the fuel cell is below the specified temperature 1, whether the temperature of the fuel cell is lower than the specified temperature 2 is decided (step S205). Here, the specified temperature 2 designates the self-startable temperature of the fuel cell, for example, −15° C. This is, when explained with an example, equal to temperature at which the fuel cell can start up to generate optimal power without a heating means such as the heater. Here, when the temperature of the fuel cell is at or above the self-startable temperature, the process passes to the same ones as the first embodiment (steps on and after S105).

Here, when the temperature of the fuel cell is below the specified temperature 2, the SV1, SV2, SV3, and SV4 are closed (step S207), while the SV5 is opened (step S209), the circulation pump 56 is further driven (step S211), and the heater H is turned on (step S213). Under such a state, the radiator 132 is by-passed and the coolant heated by the heater H circulates through the fuel cell stack 1. This state is maintained until the temperature of the fuel cell reaches the specified temperature 2 or above. Whether the fuel cell stack 1 reaches the specified temperature 2 or above is decided (step S215) and when it reaches the specified temperature 2 or above, the heater H is turned off (step S217). Since processes thereafter are same as the first embodiment, description is omitted. Thus, in this embodiment, even if the temperature of the fuel cell is equal to the self-startable temperature or below, the temperature thereof can be immediately increased up to the self-startable temperature, and thereafter the fuel cell can start in the same way as in the first embodiment.

As a method of firstly heating the fuel cell stack 1 with a heating means, such methods may be employed, in addition to a method of heating the coolant as in the second embodiment, as to provide a heating device directly heating a main body of the fuel cell stack 1 or to heat the air supplied from the air supply pass 110 with the heater 114 and pump it into the fuel cell stack 1. In such cases, it is preferable to perform heating after completing the processes in the steps S105 to S111 in advance and the coolant is taken out from the fuel cell stack 1. This allows high heating efficiency and also decreases energy consumption for heating since heat capacity of the fuel cell stack 1 is lessened.

What is claimed is:

1. A fuel cell stack system comprising:
a plurality of unit cells;
separators connecting the unit cells and alternately layered with the unit cells to form a fuel cell stack as a power-generating section, each of the separators forming a passage for supplying gas to a unit cell;
heat capacity changing means for reducing the capacity of the fuel cell stack to dissipate heat produced by power generation;
a switch for output of a demand signal demanding the fuel stack system to start power generation;
temperature detecting means for detecting temperature of the fuel cell stack; and
control means for operating the heat capacity changing means to reduce the capacity of the fuel cell stack to dissipate heat, responsive to the demand signal for start of power generation and only when the detected temperature of the fuel cell stack is below a specified value.

2. A fuel cell stack system according to claim 1:
wherein the separators further form cooling fluid passages; and
wherein the heat capacity changing means drains liquid coolant from the cooling fluid passages responsive to the demand to start power generation and subsequently refills the cooling fluid passages with the liquid coolant for cooling the fuel cell stack system during normal power generation following a startup period.

3. A fuel cell stack system according to claim 2 further comprising:
a tank for receiving liquid coolant drained from the cooling fluid passages;
liquid level sensing means for detecting level of liquid coolant within the tank; and
wherein the heat capacity changing means drains the liquid coolant into the tank until the detected level of liquid coolant within the tank rises to a first predetermined value and refills the cooling fluid passages until the detected level of liquid coolant within the tank falls to a second predetermined level.

4. A fuel cell stack system according to claim 3 wherein the tank is located below the power-generating section and wherein the heat capacity changing means drains the liquid coolant by gravity.

5. A fuel cell stack system according to claim 4 further comprising a pump for the refilling of the cooling fluid passages.

6. A fuel cell stack system according to claim 5 wherein the heat capacity changing means replaces, in the cooling fluid passages, the drained coolant with a medium having a specific heat lower than the specific heat of the coolant.

7. A fuel cell stack system according to claim 6 wherein the medium is air.

8. A fuel cell stack system according to claim 1 wherein the separators are made of metal plates.

9. A fuel cell stack system comprising:
a plurality of unit cells;
separators connecting the unit cells and alternately layered with the unit cells to form a fuel stack as a power-generating section, each separator forming a holding portion for holding liquid antifreeze for cooling the fuel cell stack;
a switch for output of a demand signal demanding the fuel stack system to start power generation;
temperature sensing means for detecting the temperature of the fuel stack; and
control means for starting power generation responsive to the demand signal, provided the holding portions are empty and the detected temperature is below a specified temperature.

10. A fuel cell stack system according to claim 9 further comprising:
a tank located below the fuel cell stack for receiving liquid antifreeze drained by gravity under control of the control means during a startup period.

11. A fuel cell stack system according to claim 9 further comprising:
liquid level sensing means for detecting level of liquid coolant within the tank; and
wherein the control means drains the liquid coolant into the tank until the detected level of liquid coolant within the tank rises to a first predetermined value and refills the holding portions until the detected level of liquid coolant within the tank falls to a second predetermined level.

12. A fuel cell stack system according to claim 9 wherein the separators are formed of metal plates.

13. A fuel cell stack system comprising:
a plurality of unit fuel cells for power generation;
at least one separator connecting unit fuel cells to form a fuel cell stack having different heat conduction paths;
a switch for output of a demand signal demanding the fuel stack system to start power generation;
temperature detecting means for detecting temperature of the fuel cell stack; and
heat conduction path changing means for changing dissipation of heat from the fuel cell stack from a first heat conduction path to a second heat conduction path having heat conductivity lower than the first heat conduction path, responsive to the demand signal for power generation and only when a detected temperature of the fuel cell stack is below a specified temperature.

14. A fuel cell stack system according to claim 13 wherein the separator is formed of a metal plate.

* * * * *